United States Patent
Kawaji et al.

(10) Patent No.: US 6,741,049 B2
(45) Date of Patent: May 25, 2004

(54) LOW VOLTAGE START UP CIRCUIT FOR BRUSHLESS DC MOTORS

(75) Inventors: Hideki Ted Kawaji, Bedford, NH (US); Mark R. White, Andover, NH (US)

(73) Assignee: Melexis NV Miroelectronics Integrated Systems, Ypres (BE)

( * ) Notice: Subject to any disclaimer, the term of this patent is extended or adjusted under 35 U.S.C. 154(b) by 0 days.

(21) Appl. No.: 10/282,921

(22) Filed: Oct. 28, 2002

(65) Prior Publication Data

US 2004/0080289 A1 Apr. 29, 2004

(51) Int. Cl.[7] .................................................. H02P 1/18
(52) U.S. Cl. ....................... 318/254; 318/138; 318/439; 318/459; 318/500; 388/928; 388/928.1; 388/923
(58) Field of Search ................... 318/254, 138, 318/439, 459, 500; 388/928, 928.1, 923

(56) References Cited

U.S. PATENT DOCUMENTS

| | | | |
|---|---|---|---|
| 4,633,150 A | * 12/1986 | Inaji et al. | 318/254 |
| 5,291,106 A | * 3/1994 | Murty et al. | 318/375 |
| 5,510,688 A | * 4/1996 | Schwarz | 318/801 |
| 5,908,453 A | * 6/1999 | Tabata et al. | 701/22 |
| 6,452,349 B1 | * 9/2002 | Hahn et al. | 318/254 |

* cited by examiner

*Primary Examiner*—Rina Duda
(74) *Attorney, Agent, or Firm*—Gerald T. Gray; Townsend and Townsend and Crew LLP

(57) ABSTRACT

A local oscillator and logic circuit pulses the open winding of a brushless DC motor at start up and the back EMF is used to generate a voltage to boost the voltage available to the control circuit for optimizing performance when starting with low supply voltage. As the rotor of a motor rotates and the windings are commutated by the drive electronics there is generated in each winding a voltage caused by the collapse of the current and the inherent inductance of the winding. These voltages exceed the normal operating voltage of the motor. The energy in these voltages is used to generate a regulated power feed to the analogue circuitry of the control circuit at a suitable voltage level. During steady state conditions, when the motor is running, the commutation of the windings is continual and there is ample energy available to power analogue electronics, and, if required, associated digital electronics as well. At start up, however, when the motor is stationary, there is no commutation and thus no additional voltage pulses from which to generate a supply for the analogue circuitry. Accordingly, additional circuitry is included to drive one of the motor windings with short voltage pulses such as to create inductive voltages that can be used to create the desired regulated power feed for the analogue circuitry. This feed, once established, enables the analogue circuitry to accurately determine the state and position of the rotor and cause the correct winding to be driven. The motor will then start and usual steady state conditions will become established.

19 Claims, 2 Drawing Sheets

Figure 1 Brushless DC Motor

LOW VOLTAGE START UP CIRCUIT FOR BRUSHLESS DC MOTORS

BACKGROUND OF THE INVENTION

The present invention relates generally to DC motors, and more particularly to low voltage start-up of brushless DC motors.

As the density and operating speeds of complex integrated circuits increases, the power dissipated thereby needs to be dispersed as heat, typically with the use of fans. Such fans are typically driven from the DC power supply connected to the power dissipating circuit such as to ensure the fan runs when the circuit is powered. DC fan motors such as those used to cool high density or high power integrated circuits, e.g., in a modem PC, are normally designed to operate with the same supply voltages as are used for the integrated circuits themselves for simplicity and cost effectiveness.

DC fan motors typically include brush-type permanent magnet motors and brushless motors. As is well known, brush-type motors typically include an armature, having windings, attached to a rotor. Brushes press against a commutator attached to the armature. As the armature turns, the brushes come into contact with different segments of the commutator and change the current path through the winding. The interaction between the magnetic field created in the armature and the permanent magnetic field in the stationary part of the motor results in rotation of the armature. Operation of a brushless motor is similar except that the permanent magnets are coupled to the rotor instead of the stationary part, and the windings are on the stationary part instead of the rotor. The winding phases of a brushless motor are switched on and off electronically by means of a control circuit. Hall effect sensors are typically used to detect the (rotational) position of the rotor, which is used by the control circuit as feedback to control the timed switching of the windings. FIG. 1 illustrates an example of a brushless DC motor 10 including permanent magnets 15 coupled to a rotor 20. Sensors 25 detect the rotational position of magnets 15. Windings 30, provided in an armature 35, are controlled by a drive controller (not shown).

One trend in integrated circuit design is to reduce the supply voltage and thus reduce the power dissipation as much as possible. However, the integrated circuits and therefore the system cannot be operated without additional cooling since the temperature rise caused by the power density can exceed the safe operating limits of the silicon. The performance of the fan is thus essential for the safe and reliable operation of the system. However, as these voltages drop to low levels, e.g., below 3.5 volts, the control of the fan motors becomes increasingly difficult. Analogue circuitry, which is often needed to handle and process signals from sensor devices, such as Hall effect sensors, used to detect the rotation of the magnet in the DC motor, may not operate effectively or accurately as the supply voltage drops below about 3.5 volts.

Specialized integrated circuits have been developed, such as the Melexis US79 series of fan drivers, that can handle all the functions required to ensure reliable fan operation. However, the analogue content of these integrated circuits, essential for their correct operation to specification, sets a lower limit to the operating voltage of about 3.5 volts. Below this figure the performance of analogue circuitry cannot be reliably predicted.

To maintain operation at lower voltages other techniques are typically used. For example, back Electro Motive Force, EMF, generated by the inductive windings of the DC motor when the current through the windings is turned off during normal commutation is typically used to boost the supply voltage available to the analogue circuitry. Digital circuitry can be configured and arranged to operate satisfactorily at voltages down to about 1.5 volts. However, when the motor is stationary, commutation is not taking place so there is no back EMF generated to supply to the analogue circuitry. The smooth and satisfactory performance of the DC motor under these conditions cannot be ensured and indeed the motor may not start if the analogue circuitry cannot resolve the situation sufficiently to enable the selection of, and drive to, the correct winding of the motor.

Accordingly, it is desirable to provide systems, methods and circuitry to generate sufficient voltage to ensure analogue circuitry of a DC motor performs sufficiently predictably to ensure satisfactory start up of the DC motor.

BRIEF SUMMARY OF THE INVENTION

The present invention provides systems, methods and circuit arrangements for ensuring proper start-up of brushless DC motors including components operating at low voltages compatible with modem IC design voltages.

According to the invention, a local oscillator and logic circuit pulses the open winding of a brushless DC motor at start up and the back EMF is used to generate a voltage to boost the voltage available to the control circuit for optimizing performance when starting with low supply voltage. As the rotor of a motor rotates and the windings are commutated by the drive electronics there is generated in each winding a voltage caused by the collapse of the current and the inherent inductance of the winding. These voltages exceed the normal operating voltage of the motor. The energy in these voltages is used to generate a regulated power feed to the analogue circuitry of the control circuit at a suitable voltage level.

During steady state conditions, when the fan is running, the commutation of the windings is continual and there is ample energy available to power the analogue electronics, and, if required, the associated digital electronics as well. At start up, however, when the motor is stationary, there is no commutation and thus no additional voltage pulses from which to generate a supply for the analogue circuitry. Accordingly, additional circuitry is included to drive one of the motor windings with short voltage pulses such as to create inductive voltages that can be used to create the desired regulated power feed for the analogue circuitry. This feed, once established, enables the analogue circuitry to accurately determine the state and position of the rotor and cause the correct winding to be driven. The motor will then start and usual steady state conditions will become established.

According to an aspect of the present invention, a circuit arrangement for driving at low voltage a brushless dc motor having a rotor and at least two windings for driving one or more permanent magnets on the rotor is provided. The arrangement typically includes drive circuits configured to provide drive signals to the windings, one or more sensors arranged to determine the rotational position of the rotor, and an analogue processing circuit configured to process signals received from the one or more sensors so as to provide a feedback signal. The circuit arrangement also typically includes a regulation circuit configured to extract energy from inductive voltages produced by the windings and to generate a voltage power source for the processing circuit, an oscillator circuit configured to provide a pulse signal, and a control circuit configured to receive the feedback signal and the pulse signal. The control circuit also configured to control the drive circuits such that in a first mode of operation, when the rotor is turning, the drive circuits are selectively enabled based on the feedback signal, and in a second mode of operation, when the rotor is not initially turning, the drive circuits are pulsed based on the pulse signal so as to generate inductive voltages in the windings.

According to another aspect of the present invention, a system for driving at low voltage a brushless dc motor having a rotor and at least two windings is provided. The system typically includes driving means for driving the individual windings on the dc motor so as to rotate the rotor, sensor means for determining the rotational position of the rotor, and analogue interface circuitry for interfacing to the sensor circuits and providing a feedback signal based on signals received from the sensor means. The system also typically includes regulation circuitry configured to extract energy from the inductive voltages produced by the windings and to generate a high voltage power source for the analogue interface circuitry, means for providing a pulse signal, and control means coupled to the analogue interface circuitry for controlling the driving means such that when the motor is turning the drive circuits are selectively enabled by timing determined from the feedback signal, and when the motor is not turning the drive means are pulsed in time based on the pulse signal such as to generate inductive voltages on the windings when they would otherwise be not present.

According to yet another aspect of the present invention, a method is provided for driving a brushless dc motor having a rotor and at least two windings configured to drive one or more permanent magnets coupled to the rotor. The method typically includes generating pulsed drive signals using drive circuits connected to the windings so as to rotate the rotor and thereby generate inductive voltage signals in the windings, and generating a high voltage power source using the inductive voltage signals generated by the windings. The method also typically includes sensing the rotational position of the rotor using one or more sensors, processing signals provided by the one or more sensors using an analogue processing circuit so as to produce a feedback signal, the analogue processing circuit being powered by the generated high voltage power source, and selectively powering the drive circuits based on the feedback signal so as to rotate the rotor in a continuous manner.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION OF THE INVENTION

Figure 1:
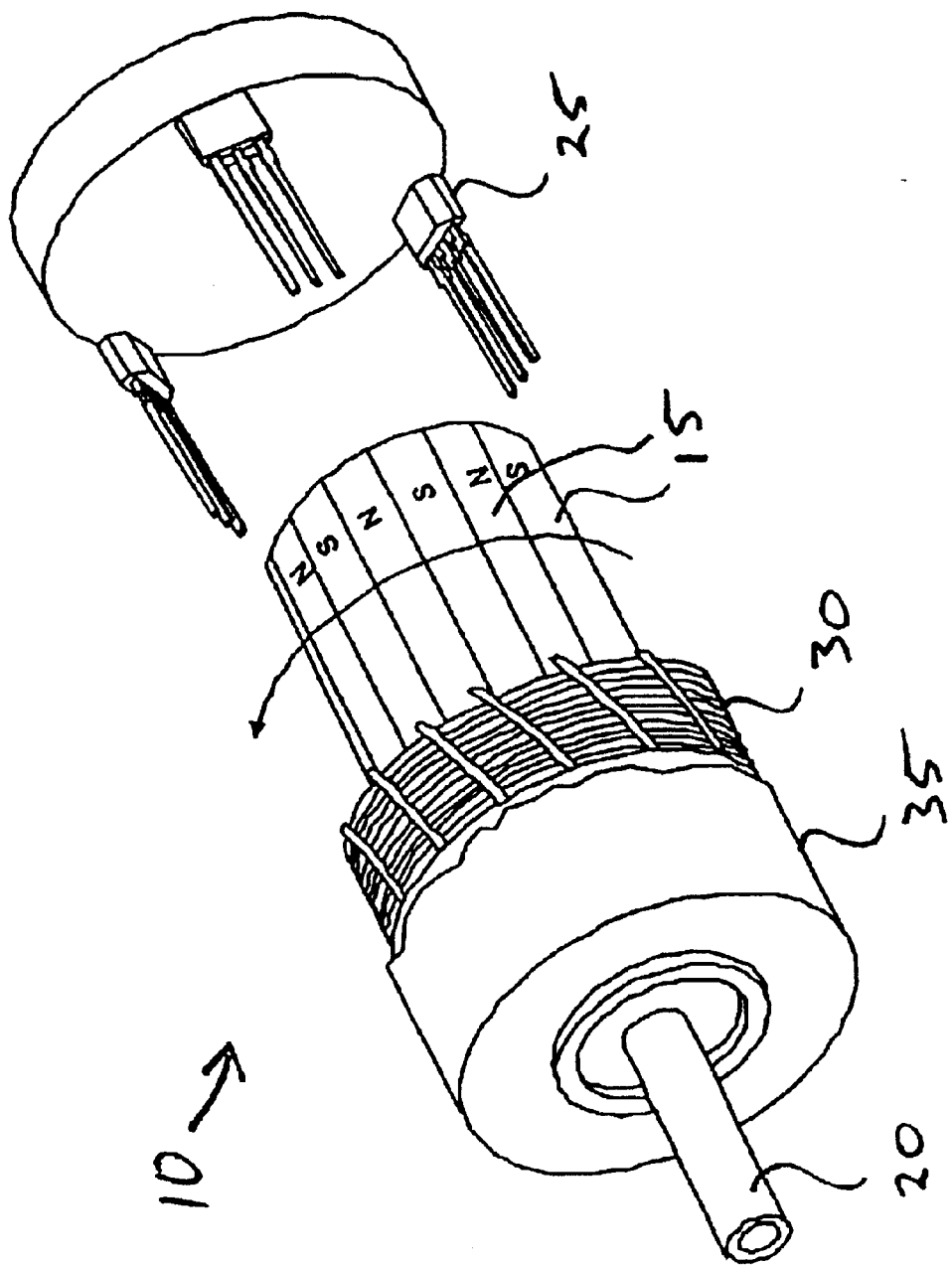
FIG. 1 illustrates an example of a brushless DC motor including permanent magnets coupled to a rotor.
Figure 2:
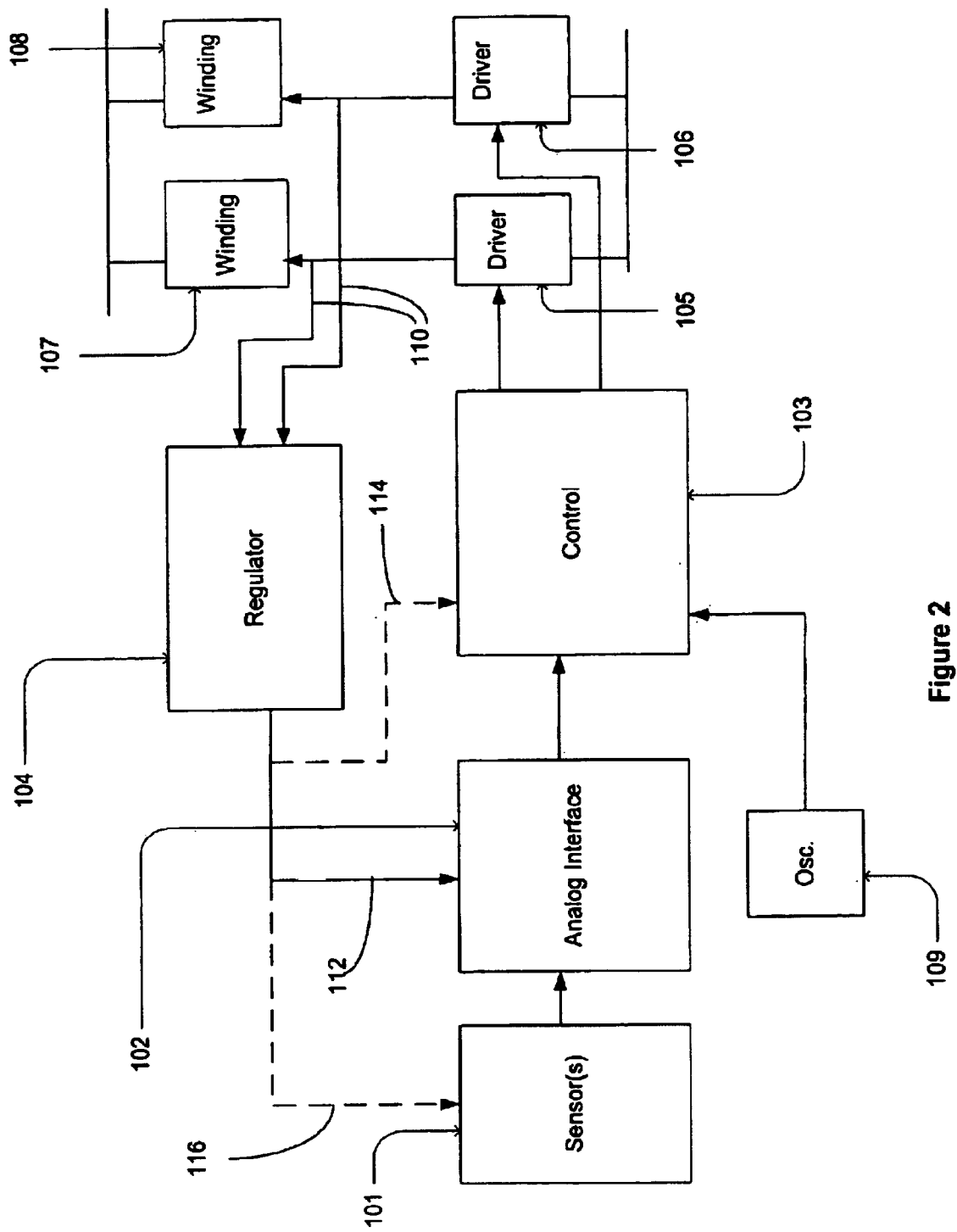
FIG. 2 is a schematic diagram of DC motor drive circuitry according to an embodiment of the invention showing the basic elements and their connections.

FIG. 2 illustrates an embodiment of a permanent magnet DC motor including two windings 107 and 108 which are driven alternately by two driver circuits 105 and 106. The driver circuits are controlled by drive signals applied thereto by control circuit 103.

In a first control mode, e.g., in steady state operation, the DC motor rotates and the rotation is sensed by one or more sensors, preferably hall effect sensors, 101. Hall IC latches, such as devices identified as model number US1881, US2881, and US3881, and provided by Melexis (41 Locke Road, Concord, N.H. 03301), are useful sensors for such brushless DC motor applications. The output of the sensor(s) is connected to an analogue interface circuit 102 where the signal is amplified and passed to the control circuit 103. As the motor rotates and control circuit 103 turns the driver circuits alternately on and off, the combination of the changes in current and the inductance of the windings 107 and 108 results in voltage pulses (e.g., narrow voltage spikes) being generated. The voltage pulses are provided to a regulator circuit 104 over line(s) 110. These voltage pulses will typically be at a voltage level that is higher than the normal operating voltage of the DC motor. In one embodiment, regulator circuit 104 is configured and arranged to rectify the narrow voltage pulses and to generate a DC supply voltage, e.g., at a voltage level higher than the operating voltage. For example, in one embodiment, the normal operating voltage is about 1.5 V or higher and the regulation circuit 104 is configured to supply a DC voltage of 3.5V or higher. Regulator circuit 104 preferably includes, in one embodiment, a voltage regulator and/or a step-up circuit. In one embodiment, for example, the regulator includes a diode to rectify, a zener to limit the voltage and some capacitance. The DC supply voltage generated by regulator circuit 104 is then used to supply the analogue interface circuit 102 over line 112.

During the period of time when the DC motor is rotating and the driver circuits are switching, regulator 104 is able to generate the higher level voltage supply and the system is self-maintaining. When, however, the motor is stationary, as for example when power is first applied, there is no switching of the drive circuits and hence no inductively generated voltage pulses and no energy for regulator 104 to use for the high voltage supply. Analogue interface circuit 102 will therefore be operating at a supply voltage below its optimum, and the performance may well be degraded to such an extent that control circuit 103 may not switch the drive circuits and the DC motor will not start.

According to one embodiment of the present invention, an oscillator circuit 109 is provided to supply a periodic signal to the control circuit 103. In this embodiment, control circuit 103 is configured to operate in a second control mode wherein the control circuit uses the signal provided by oscillator 109 to control one (or both) of the drive circuits 105 and 106 to turn on and off one (or both) of the DC motor windings such as to create inductively induced voltage pulses. Regulator 104 uses the inductively induced voltage pulses to generate a high voltage supply such that the analogue interface 102 can operate within design parameters and the DC motor will be properly started.

The design of oscillator 108 can be any well-known oscillator circuit arrangement configured to start and continue to provide an oscillation signal at low voltages, e.g., voltages that are high enough to turn the DC motor but too low for the analogue interface 102 to operate sufficiently and generate useful signals such as to enable the control circuit 103 to switch the drive circuits 105 and 106 and so maintain steady state rotation of the DC motor. The choice of oscillator will generally depend on the technology chosen for the main integrated circuitry. For example, the oscillator can include a ring containing an odd number of inverters which will oscillate. It should be appreciated that any oscillator as is well known may be used, so long as the chosen oscillator starts and keeps running on a low voltage.

In another embodiment, the control circuit 103 is further configured and arranged to receive the high voltage supply from regulator 104 as an input on line 114. In this embodiment, control circuit 103 is also configured to switch between the second control mode and the first control mode once the high voltage supply of regulator circuit 104 has reached or risen above a predetermined threshold level indicating that the high voltage supply is at a sufficient level for the analogue interface 102 to operate within specification. A trigger circuit or threshold circuit is preferably included in circuit 103 to facilitate mode switching.

In a further embodiment of the invention, the high voltage supply is also provided to the sensor circuit(s) over line 116 to enable the use of sensor(s) circuits that require a higher operating voltage for optimum performance.

The drive control circuitry, e.g., control circuit 103, regulator 104, analog interface circuitry 102, oscillator 109, and drive circuits 105 and 106, are preferably implemented on a single Integrated Circuit (IC) structure, e.g., a controller IC. However, it should be understood that each or a combination of such circuit elements may be implemented on separate ICs.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. For example, it should be appreciated that more than two windings (and corresponding drive circuits) may be used. Therefore, the scope of the appended claims should be accorded the broadest interpretation so as to encompass all such modifications and similar arrangements.

What is claimed is:

1. A circuit arrangement for driving at low voltage a brushless dc motor having a rotor and at least two windings for driving one or more permanent magnets on the rotor, the arrangement comprising:

drive circuits configured to provide drive signals to the windings;

one or more sensors arranged to determine the rotational position of the rotor;

an analogue processing circuit configured to process signals received from the one or more sensors so as to provide a feedback signal;

a regulation circuit configured to extract energy from inductive voltages produced by the windings and to generate a voltage power source for the processing circuit;

an oscillator circuit configured to provide a pulse signal; and a control circuit configured to receive the feedback signal and the pulse signal, the control circuit being further configured to control the drive circuits such that:
  in a first mode of operation, when the rotor is turning, the drive circuits are selectively enabled based on the feedback signal; and
  in a second mode of operation, when the rotor is not turning, the drive circuits are pulsed based on the pulse signal so as to generate inductive voltages in the windings.

2. The circuit arrangement of claim 1, wherein the one or more sensors each include a hall effect sensor.

3. The circuit arrangement of claim 1, wherein the voltage power source is connected to the one or more sensors.

4. The circuit arrangement of claim 1, wherein the processing circuit is configured to amplify the signals received from the one or more sensors.

5. The circuit arrangement of claim 1, wherein the voltage power source is connected to the control circuit.

6. The circuit arrangement of claim 1, wherein the control circuit operates using a first power supply voltage that is lower than the voltage power supply generated by the regulation circuit.

7. The circuit arrangement of claim 6, wherein the first power supply voltage is approximately 1.5 V and wherein the voltage power supply generated by the regulation circuit is approximately 3.5 V or above.

8. The circuit arrangement of claim 1, wherein the analogue processing circuit, regulation circuit, oscillator circuit and control circuit are implemented on a single integrated chip.

9. A system for driving at low voltage a brushless dc motor having a rotor and at least two windings, the system comprising:

driving means for driving the individual windings on the dc motor so as to rotate the rotor;

sensor means for determining the rotational position of the rotor;

analogue interface circuitry for interfacing to the sensor circuits and providing a feedback signal based on signals received from the sensor means;

regulation circuitry configured to extract energy from the inductive voltages produced by the windings and to generate a high voltage power source for the analogue interface circuitry;

means for providing a pulse signal; and control means coupled to the analogue interface circuitry for controlling the driving means such that when the motor is turning the drive circuits are selectively enabled by timing determined from the feedback signal, and when the motor is not turning the drive means are pulsed in time based on the pulse signal such as to generate inductive voltages on the windings when they would otherwise be not present.

10. The system of claim 9, wherein the sensor means is also connected to the high voltage power source.

11. The system of claim 9, wherein the sensor means includes one or more hall effect sensors configured to detect the rotational position of one or more permanent magnets coupled to the rotor.

12. The system of claim 9, wherein the control means includes circuitry that operates using a first power supply voltage that is lower than the voltage power supply generated by the regulation circuit.

13. The system of claim 12, wherein the first power supply voltage is approximately 1.5 V and wherein the voltage power supply generated by the regulation circuitry is approximately 3.5 V or above.

14. The system of claim 9, wherein the high voltage power source is connected to the control means.

15. The system of claim 9, wherein the analogue interface circuitry, regulation circuitry, means for providing a pulse signal and control means are implemented as circuitry on a single integrated chip.

16. A method of driving a brushless dc motor having a rotor and at least two windings configured to drive one or more permanent magnets coupled to the rotor, the method comprising:

in a first mode of operation wherein the rotor is not initially rotating, generating pulsed drive signals using drive circuits connected to the windings so as to rotate the rotor and thereby generate inductive voltage signals in the windings;

generating a high voltage power source using the inductive voltage signals generated by the windings; and thereafter, in a second mode of operation:

sensing the rotational position of the rotor using one or more sensors;

processing signals provided by the one or more sensors using an analogue processing circuit so as to produce a feedback signal, said analogue processing circuit being powered by said high voltage power source; and selectively powering the drive circuits based on the feedback signal so as to rotate the rotor in a continuous manner.

17. The method of claim 16, wherein the one or more sensors include one or more Hall effect sensors.

18. The method of claim 16, wherein the one or more sensors are also powered by the high voltage power source.

19. The method of claim 16, further comprising determining whether the high voltage power source has accumulated a threshold amount of power.

* * * * *